(12) United States Patent
Amonou et al.

(10) Patent No.: US 8,483,493 B2
(45) Date of Patent: Jul. 9, 2013

(54) METHOD FOR THE VARIABLE-COMPLEXITY DECODING OF AN IMAGE SIGNAL, CORRESPONDING DECODING TERMINAL, ENCODING METHOD, ENCODING DEVICE, COMPUTER SIGNAL AND PROGRAMS

(75) Inventors: Isabelle Amonou, Cesson-Sevigne (FR); Nathalie Cammas, Sens de Bretagne (FR); Sylvain Kervadec, Sens de Bretagne (FR); Stephane Pateux, Rennes (FR)

(73) Assignee: France Telecom, Paris (FR)

( * ) Notice: Subject to any disclaimer, the term of this patent is extended or adjusted under 35 U.S.C. 154(b) by 378 days.

(21) Appl. No.: 12/809,838

(22) PCT Filed: Dec. 19, 2008

(86) PCT No.: PCT/FR2008/052393
§ 371 (c)(1),
(2), (4) Date: Jun. 21, 2010

(87) PCT Pub. No.: WO2009/087331
PCT Pub. Date: Jul. 16, 2009

(65) Prior Publication Data
US 2010/0278444 A1 Nov. 4, 2010

(30) Foreign Application Priority Data
Dec. 21, 2007 (FR) .................................... 07 60304

(51) Int. Cl.
*G06K 9/36* (2006.01)
*G06K 9/46* (2006.01)
*H04B 1/66* (2006.01)
*H04N 7/12* (2006.01)
*H04N 11/02* (2006.01)
*H04N 11/04* (2006.01)

(52) U.S. Cl.
USPC ...................................... 382/233; 375/240.25

(58) Field of Classification Search
USPC ............................... 382/232, 233; 375/240.25
See application file for complete search history.

(56) References Cited

U.S. PATENT DOCUMENTS

| | | | | |
|---|---|---|---|---|
| 6,618,445 | B1 * | 9/2003 | Peng et al. | 375/240.25 |
| 6,680,973 | B2 * | 1/2004 | Peng et al. | 375/240.15 |
| 6,947,488 | B2 * | 9/2005 | Peng et al. | 375/240.25 |
| 7,133,455 | B2 * | 11/2006 | Henning | 375/240.27 |

FOREIGN PATENT DOCUMENTS

| | | |
|---|---|---|
| WO | 0251160 A2 | 6/2002 |
| WO | 02080571 A2 | 10/2002 |

OTHER PUBLICATIONS

French Search Report and Written Opinion dated Dec. 1, 2008 for corresponding French Application No. FR 0760304, filed Dec. 21, 2007.
International Search Report and Written Opinion, dated Jul. 21, 2009 for corresponding International Application No. PCT/FR2008/052393, filed Dec. 19, 2008.

* cited by examiner

*Primary Examiner* — Bernard Krasnic
(74) *Attorney, Agent, or Firm* — David D. Brush; Westman, Champlin & Kelly, P.A.

(57) ABSTRACT

A method is provided decoding a digital image signal in a decoding terminal that uses a variable-complexity decoding, enabling, for at least one step in the decoding, selection of at least one decoding tool from at least two available decoding tools. The method includes the following steps: identifying from the images control images and intermediate images; applying to each of the control images, for at least one step of the decoding, at least one predetermined decoding tool imposed by the signal; applying to at least one of the intermediate images, for at least one step of the decoding, at least one decoding tool selected by the decoding terminal and not imposed by the signal.

7 Claims, 5 Drawing Sheets

METHOD FOR THE VARIABLE-COMPLEXITY DECODING OF AN IMAGE SIGNAL, CORRESPONDING DECODING TERMINAL, ENCODING METHOD, ENCODING DEVICE, COMPUTER SIGNAL AND PROGRAMS

CROSS-REFERENCE TO RELATED APPLICATIONS

This Application is a Section 371 National Stage Application of International Application No. PCT/FR2008/052393, filed Dec. 19, 2008 and published as WO 2009/087331 on Jul. 16, 2009, not in English.

STATEMENT REGARDING FEDERALLY SPONSORED RESEARCH OR DEVELOPMENT

None.

THE NAMES OF PARTIES TO A JOINT RESEARCH AGREEMENT

None.

FIELD OF THE DISCLOSURE

The field of the disclosure is that of the encoding and decoding of digital signals and especially video signals or image carrying signals.

More specifically, the disclosure pertains to scalable encoding and decoding by which decoders can adapt the decoding of a received signal to their processing capacity or to a user's requirements.

BACKGROUND OF THE DISCLOSURE

The principle of scalability, designed to provide different levels of rebuilding from a single bitstream received by a decoder, is already known. For example, it makes it possible to propose different levels of rebuilding of a video from the received stream. These levels of rebuilding depend especially on the complexity of the decoding operations to be applied.

This is the case, for example, in the current H.264 standard which proposes scalability based on a hierarchical approach with inter-layer prediction enabling limits to be placed on redundancy between layers (see for example "SVC-Amendment 3" of the H.264/MPEG-4 AVC standard). The same information is represented at different hierarchical levels with a progression in quality and/or in resolution.

The SVC encoder proposes scalability in the sense that each decoder can choose the quantity of data that it will process as a function of the hierarchical levels that it chooses. The number of information pieces to be decoded can thus be reduced, of course with a trade-off in terms of deterioration of the quality of images rendered.

In order to limit the complexity of decoding of a stream according to a video standard (for example H.264), certain special applications provide for redefining certain decoding operations on the basis of less complex tools. However, this redefinition of the tools used in decoding must be taken into account in the process of encoding of the stream in order to prevent the decoder from drifting. Drift is the desynchronization of the decoded images which act as reference images for the temporal prediction between the encoder and the decoder. If these images are not identical at both the encoder and the decoder, then the' decoder rebuilds images with errors which accumulate in the course of time.

SUMMARY

The solution proposed by an exemplary embodiment of the invention does not have these prior-art drawbacks. An embodiment pertains to a method for decoding a digital image signal in a decoding terminal implementing a variable-complexity decoding making it possible, for at least one step of the decoding, to select at least one decoding tool from among at least two available decoding tools.

A decoding method of this kind, according to an embodiment of the invention, comprises the following steps:
identifying first images, among said images, called control images, and second images called intermediate images;
applying, to each of said control images, for at least one step of the decoding, at least one predetermined decoding tool dictated by said signal;
applying, to at least one of said intermediate images, for at least one step of the decoding, at least one decoding tool selected by said decoding terminal and not dictated by said signal.

Thus, scalability in complexity at decoding is proposed, playing on the quality of the rebuilt sequence. Different decoders can implement different forms of decoding according to their resources especially with respect to intermediate images (or only some of them) without constraints on the encoding of these images.

In other words, for the intermediate images, the decoding tool or tools used for a decoding step can lead to a result different from the one obtained by a decoding tool dictated for a control image for said step of the decoding process.

The risks of drift are limited through control images for which all the decoders use the same decoding tools, namely those taken into account by the decoding.

The control images can be identified explicitly (information present in the image signal) or implicitly (each decoder being capable in principle of identifying these images in the stream that it receives).

An embodiment of the invention can be applied to many types of signals, or streams, especially video signals or streams, received in various terminals such as radio-telephones, television decoders (for example set-top boxes), multimedia terminals or computer terminals.

Should said signal comprise firstly non-degradable information (for example "I" images or images of a given hierarchical level) and secondly degradable information (for example "P" or "B" images or images of a higher hierarchical level), on the basis of at least one piece of information, said identification step considers at least said non-degradable information to be control images.

Should said signal be formed by images having a hierarchical temporal prediction structure, each image of a temporal hierarchical level being encoded by spatial prediction or by temporal prediction on the basis of at least one image of the same temporal level or of the previous temporal level in the hierarchy, then said identification step can consider at least said images of a pre-determined temporal level (forming the non-degradable information for the decoding of the higher hierarchical levels) to be control images.

According to a first embodiment of the invention, said identification step comprises a step for the reading, in said signal, of at least one piece of information identifying said control images.

This information enables a decoder to distinguish the images in the stream having an imposed processing. According to another embodiment, the identification may be implicit and not require a piece of identification information of this kind (for example because the terminal knows in principle which are the control images).

Said identification step may, depending on the embodiments, also include a step for reading, in said signal, at least one piece of processing information for at least one of said control images, specifying said predetermined decoding tool or tools to be applied to said control image.

It is thus possible to dictate distinct processing operations to different control images, for example depending on particular characteristics of these images (in terms of movement, type of image etc).

In a particular approach of an embodiment of the invention, the method selectively implements a plurality of sequences of decoding tools each comprising at least one of said tools and said applications steps use, for each of said images, one of said sequences of decoding tools.

Said tools may especially belong to the group comprising:
spatial prediction tools taking account of all or part of the frequency coefficients of at least one part of at least one image;
temporal prediction tools using interpolation filters of different sizes;
tools for taking account of pixel or subpixel motion;
block effect filtering tools;
motion compensation tools using different motion models;
image synthesis tools;
at least two tools providing for a same decoding function and using different levels of binary representation.

The tools available in the terminals can therefore be varied and adapted to different types of terminals without any set principles as regards the encoding (provided that the tools imposed for the control images are present). They may also be open-ended.

An embodiment of the invention also pertains to a terminal for decoding a digital image signal, implementing a variable-complexity decoding as described here above.

Such a terminal comprises especially:
means for identifying, among said images, first images called control images, and second images called intermediate images;
means for applying, to each of said control images, at least one predetermined decoding tool dictated by said signal;
means for applying, to at least one of said intermediate images, at least one decoding tool selected by said decoding terminal and not dictated by said signal.

An embodiment of the invention also pertains to a computer program product downloadable from a communications network and/or recorded on a computer-readable carrier and/or executable by a processor, characterized in that it comprises program code instructions for implementing the decoding method described here above.

An embodiment of the invention also pertains to a method for encoding a digital image signal that is to be decoded in at least one decoding terminal implementing a variable-complexity decoding according to certain embodiments of the method described here above.

This encoding method comprises especially the following steps:
identifying, among said images, first images called control images, and second images called intermediate images, each of said control images having to be processed, in said decoding terminal or terminals, by at least one predetermined decoding tool, and at least one of said intermediate images being capable of being processed by at least one decoding tool selected by a decoding terminal;
inserting, into said signal, at least one piece of information identifying said control images.

This piece of information on identification makes it possible, when decoding, to distinguish the control images which undergo an imposed decoding and the intermediate images which the terminal is free to decode as it wishes, according to its means.

In a first particular embodiment, said insertion step comprises a step for encoding a field of identification data associated with each of said images.

Thus, in starting the processing of a current image by reading this field of identification data, the decoder knows whether it is a control image or an intermediate image.

According to a second embodiment, said insertion step comprises a step for encoding a preamble data field defining the structure of said signal in terms of distribution of said control images and said intermediate images.

In this case, when the decoder starts processing the signal, it knows those images of the stream that will be control images. This data field can be repeated periodically, especially for the signals to which a terminal can get connected at any point in time during broadcasting.

According to one particular aspect of an embodiment of the invention, said insertion step comprises a step of decoding, for at least one of said control images, of a piece of information of a decoding type defining said decoding tool or tools that have to be used for the decoding of said control image or images.

It is thus possible to propose different encoding operations for the control images according to need.

Should one of said decoding terminals selectively implement a plurality of sequences of decoding tools each comprising at least one of said tools, this information on type of decoding can designate one of said sequences of decoding tools.

An embodiment of the invention furthermore pertains to a device for encoding a digital image signal implementing the method presented here above and comprising:
means for identifying, among said images, first images called control images, and second images called intermediate images, each of said control images having to be processed, in said decoding terminal or terminals, by at least one predetermined decoding tool, and at least one of said intermediate images being capable of being processed by at least one decoding tool selected by a decoding terminal;
means for inserting, into said signal, at least one piece of information identifying said control images.

An embodiment of the invention also pertains to a computer program product downloadable from a communications network and/or recorded on a computer-readable carrier and/or executable by a processor, characterized in that it comprises program code instructions for implementing the decoding method described here above.

An embodiment of the invention also pertains to a digital image signal produced by the encoding method described here above and designed to be decoded in at least one decoding terminal implementing a variable-complexity decoding making it possible to select at least one decoding tool from among at least two available decoding tools.

A signal of this kind comprises first images, called control images, and second images, called intermediate images, each of said control images having to be processed in said decoding terminal or terminals by at least one predetermined decoding tool and at least one of said intermediate images being capable of being processed by at least one decoding tool selected by a decoding terminal and at least one piece of information for identifying said control images.

According to certain embodiments, such a signal may include firstly non-degradable information and secondly degradable information obtained by spatial prediction and/or temporal prediction on the basis of at least one piece of degradable or non-degradable piece of information.

An embodiment of the invention finally pertains to a data carrier carrying at least one digital image signal of this kind.

BRIEF DESCRIPTION OF THE DRAWINGS

Other features and advantages should appear more clearly from the following description given by way of a simple and non-exhaustive illustrative example, and from the appended drawings of which.

DETAILED DESCRIPTION OF ILLUSTRATIVE EMBODIMENTS

1. Reminder of the Principle of an Embodiment of the Invention

An embodiment of the invention therefore proposes an innovative approach to the problem of scalability in complexity. From the same quantity of information received, each decoder can choose the decoding complexity that it can support and/or corresponds to a quality required by the user, by using certain tools rather than others for the decoding operations.

This approach is particularly but not exclusively worthwhile in the context of video applications designed for terminals of different decoding capacities (for example mobile terminals).

The process of decoding a stream comprises a process for reading information contained in the stream (this process corresponds to syntactic decoding) and a process for rebuilding data on the basis of the information read. An embodiment of the invention is independent of the information-reading process and can be applied to the rebuilding process performed during the decoding.

It must therefore be noted that an embodiment of the invention applies to any data-compression standard whatsoever, especially video, whether or not it is scalable. Contrary to current approaches proposed for scalability, an embodiment of the invention proposes an approach to scalability in complexity in the operations implemented during the rebuilding process performed at decoding, independently of the syntax used to encode and transmit the video stream.

Thus, an embodiment of the invention differs from the prior-art techniques used to adapt complexity to the decoding of a stream, which have the drawback of imposing this choice on the encoder or of rapidly going into drift.

In particular, the approach of an embodiment of the invention differs from that of SVC and other prior-art scalable systems by proposing a decoding system in which the decoding steps can be performed with tools of varying complexity, the choice between these tools being done solely at the level of the decoder.

In order that this approach may be efficient and reliable, an embodiment of the invention also proposes a method for controlling the drift between the encoder and the decoder when less complex tools are used in decoding. This mechanism relies on the distinction between two types of images:

images known as control images for which the decoding processing operation is dictated by the encoder (or by a definition, for example a standardized definition, of the encoding);

images known as intermediate images which the decoding terminals are free to decode as required (whether it is by applying a downgraded processing or an improved processing or the same processing as the one used for encoding).

Figure 1:
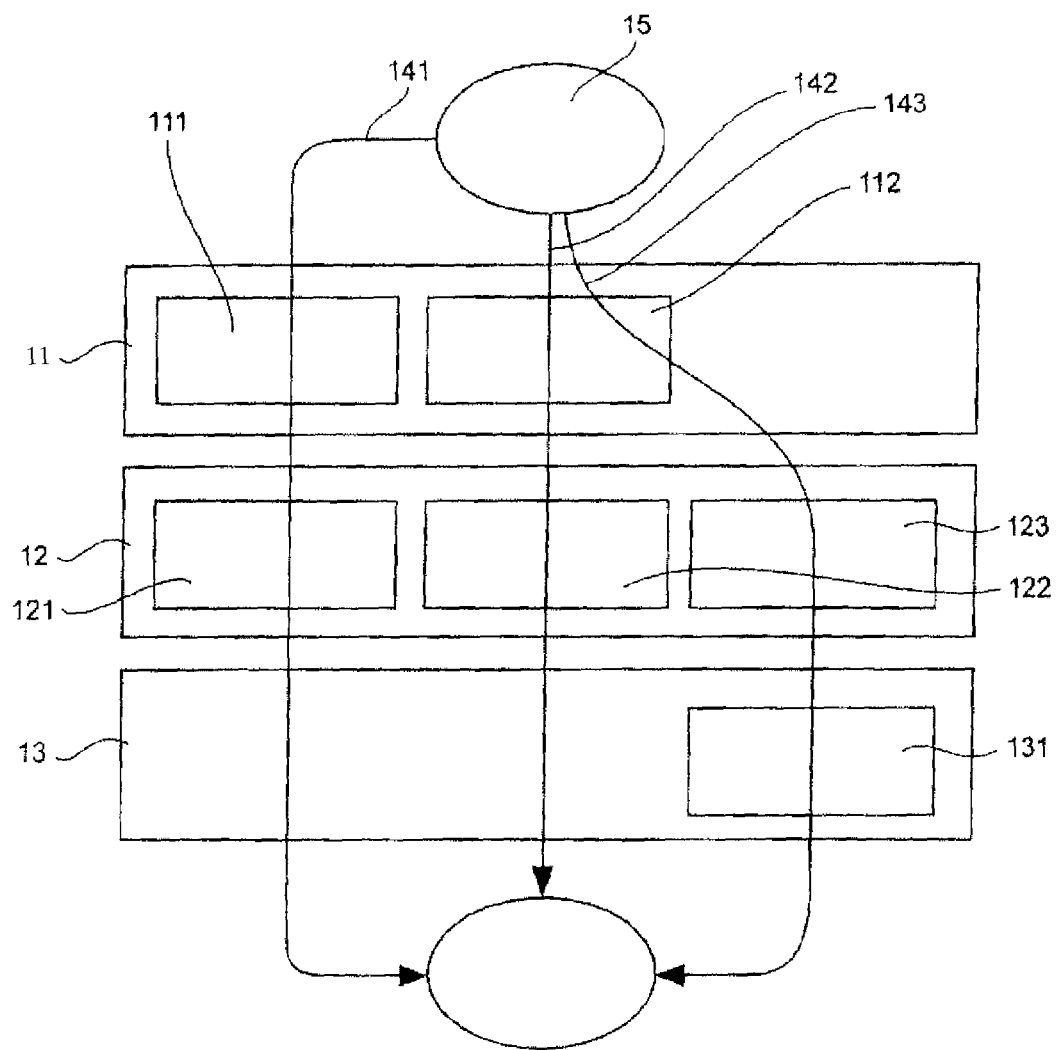
FIG. 1 illustrates the general principle of an embodiment of the invention with three possible parts or sequences of decoding.

FIG. 1 provides a general illustration of the method of decoding according to an embodiment of the invention. This decoding comprises a certain number of steps, such as:

step 11: decoding of residues;
step 12: motion compensation;
step 13: data synthesis.

Each step can be performed with different tools. For example, the decoding 11 of the residues (transformed coefficients resulting from a DCT applied to the encoding) can be provided by:

a tool 111 of reduced complexity that takes account only of the DC coefficient (direct coefficient) of the DCT transform;

a tool 112 of greater complexity taking account of the set of DC and AC coefficients of the DCT.

Other tools not shown can take account only of a part of the AC coefficients.

The motion-compensation step 12 can be implemented by:
a compensation tool 121 working up to the nearest pixel;
a compensation tool 122 working up to the nearest half-pixel;
a compensation tool 123 working up to the nearest quarter-pixel;
etc The step 13 may include a single texture-synthesis tool 131 whose implementation is optional.

These tools, their number and their distribution are given as an example of the principle of an embodiment of the invention and it is clear that various variants and adaptations are possible.

The decoder of an embodiment of the invention adapts its decoding process to the complexity of the tools that it is capable of applying and which it has at its disposal (it is not obligatory that all the decoders should have all the tools available, since the selection of these tools is not done at decoding. On the contrary, an embodiment of the invention provides many types of decoders, and open-ended decoders, which can be equipped with new tools, for example by downloading, without its being necessary to adapt the encoding standard).

Several paths or sequences of decoding 141, 142, 143 are then possible with a same data stream 15 that is received or read.

For example, the path 141, which uses the tools 111 and 121 is a low-complexity decoding path and the path 143 which uses the tools 112, 123 and 131 is a high-complexity decoding path. The path 142 using the tools 112 and 122 is a medium-complexity decoding path. It can be noted that certain tools can be shared by several paths.

One of the paths may be compatible with decoding path defined by any compression standard whatsoever, for example H.264/AVC.

In order to control the drift between the encoder and the decoder, an embodiment of the invention provides that certain predetermined images, called control images, will be decoded in following an imposed, predetermined path. For example, the path 141 will be used obligatorily for the decoding of these images, whatever the processing capacities available for the decoder.

These control images control the drift between the encoder and the decoder. The path followed by the control images is not necessarily the path of minimum complexity nor is it necessarily that of the maximum level of complexity. It can be the same for all the control images or it may vary according to the type or temporal level of the control image or it may be specified for each image by the encoder.

By contrast, the decoding is not dictated for the other images known as intermediate images. Hence, for these images, the decoder chooses the most suitable path according to criteria such as resources, the tools available to it, a request by the user, a size of rendered image etc.

2. Example Implementation

An embodiment of the invention can be applied especially to all video encoders. The embodiment described here below applies especially in the context of the deliberations and work of drafting the future H.265 standard. However, the syntax of the encoder used is not specified since the decoding mechanism described can be applied to all existing video encoders.

2.1 General Encoding Scheme

As already indicated, an embodiment of the invention makes it possible not to dictate special conditions for encoding (except in certain embodiments where there is an explicit identification of the control images and/or an explicit indication of the decoding path to be used for these images).

The encoder therefore uses a classic scheme based on intra-image and inter-image prediction, for example an H.264 encoder. "I" images are encoded by spatial prediction while "P" and "B" images are encoded by spatial or temporal prediction relative to other "encoded/decoded or synthesized I", "P" or "B" images. These synthesized images used for temporal prediction are created for example by a textural synthesis mechanism.

The images are subdivided into blocks. For each block, a residual block is encoded corresponding to the original block minus a prediction. The coefficients of this block are quantified after transformation as the case may be, and then encoded by an entropic encoder.

Figure 2:
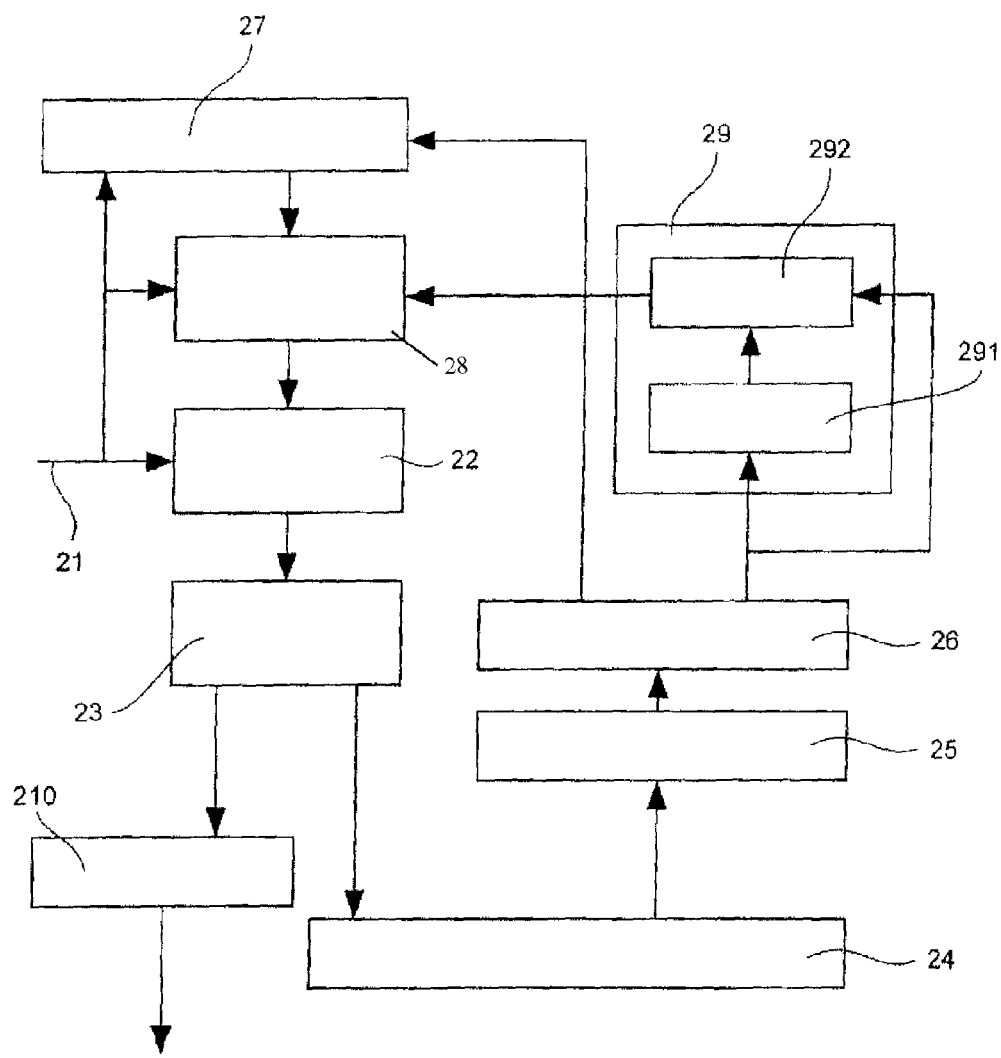
FIG. 2 presents an example of an encoding scheme known per se.

FIG. 2 recalls the general principle of such encoding.

The images to be encoded 21 are provided at input of a decision module 22 for deciding on the type of encoding. If the image to be encoded is an "I" image, it is subdivided into blocks and encoded by spatial prediction only. Each block of the image is encoded (23) by using spatial prediction. The prediction for this block is formed out of encoded-decoded blocks within the current image. The residues coming from the difference between the block and the prediction are transformed, quantified and encoded by an entropic encoder.

The image is rebuilt by performing (24) the operations in reverse: entropic decoding, inverse quantification, inverse transformation, adding of the prediction. The rebuilt image undergoes a step 25 for reducing the effects of blocks implemented by means of filtering, and then it is added to the list 26 of reference images.

If the image to be encoded is a "P" or "B" image, the motion estimation module of the encoding 27 computes the motion between the current image to be encoded and one or more reference images contained in the list 26 of the reference images. The motion estimation module 27 gives the motion parameters (motion vectors, reference images used) to the module for computing the prediction 28.

An analysis/synthesis step 29 can also be performed on the basis of the image of the list of reference images in order to create a synthesized image that can serve for prediction. The analysis 291 computes the parameters needed for the synthesis (creation) 292 of a new image (synthesized image).

For each block of the image to be encoded, the decision module 22 chooses the best prediction from among the possible predictions: temporal prediction on the basis of one or more reference images, spatial prediction or prediction based on the synthesized image. The residues coming from the difference between the block and the prediction are transformed, quantified and encoded by an entropic encoder.

If the image must serve as a reference for a future image to be encoded, the encoded image is rebuilt (24) by performing the operations in reverse: inverse quantification, inverse transformation, adding of the prediction. The rebuilt image undergoes a step of reduction of the different block effects implemented by means of filtering and then it is added to the list of the reference images.

The encoded signal 210, of bit stream, can then be transmitted or stored. Other preliminary bit-rate reduction processing operations, such as an entropic encoding, are possible. More generally, other encoding means may be used.

2.2 General Decoding Scheme

Figure 3:
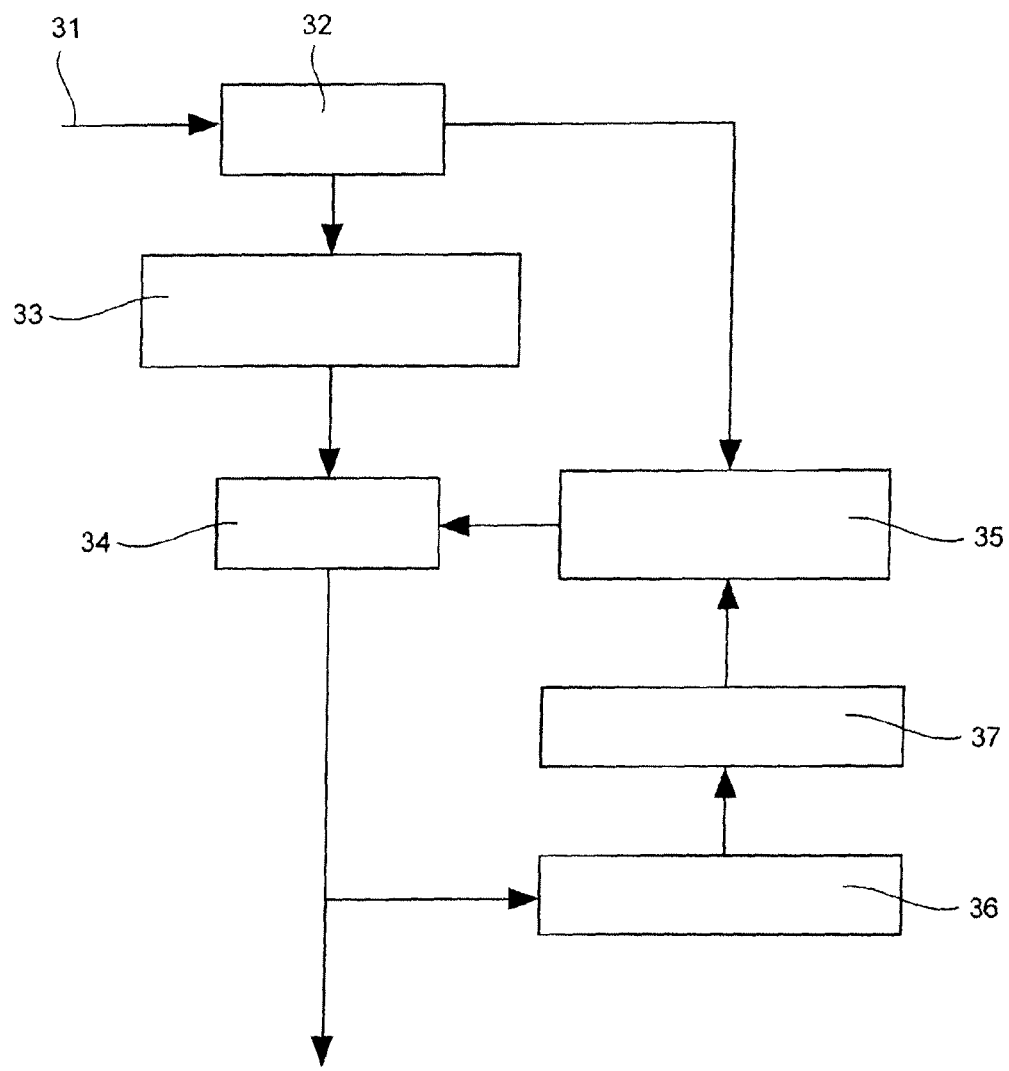
FIG. 3 shows a decoding scheme, also known, adapted through the encoding of FIG. 2.

FIG. 3 illustrates the general mechanism of decoding. The bit-stream received 31 is sent to a syntactic decoder 32 which carries out the entropic decoding of the data of the current image. For each block of the image to be rebuilt, the coefficients are sent to the module 33 which carries out the inverse quantification and the inverse transformation. The prediction of each block is computed (34) and then added (35) to the rebuilt residues. The syntactic decoder 32 also extracts information needed for the prediction, for example motion parameters, synthesis parameters, types of prediction etc.

If the image serves a reference for a future image to be decoded, it then undergoes a step 36 for reducing block effects implemented by means of filtering operations, and then it is added (37) to the list of reference images. It will be noted that certain steps of the decoding are also present in the encoding mechanism: inverse quantification, inverse transformation, computation of prediction, reduction of block effects.

A post-processing operation can be applied to the rebuilt images in order to improve the quality of rendering of these images independently of the other images (not shown in FIG. 3).

2.3 Variable-Complexity Decoding.

Independently of the tools used for the encoding of the images, each decoder of an embodiment of the invention can adapt its decoding complexity by choosing, for each step of the decoding, tools that are more complex or less complex than those used for the encoding.

For example, the following operations can be performed with variable complexity:

during the spatial prediction: the prediction can be formed out of a block for which all the coefficients have been rebuilt or else from a block of which only the direct coefficient or the low-frequency coefficients have been rebuilt;

during the temporal prediction: a motion compensation of the reference images is done. In the event of sub-pixel motions, this motion compensation calls for an interpolation of the reference image by means of an interpolation filter, the size of the filter used causes the complexity to vary. The longer the filter, the more complex will be the interpolation operation;

the precision of the motion has an impact on the complexity of the prediction. A sub-pixel motion calls for an interpolation relative to a pixel motion;

in order to improve the quality of the images serving as a reference, a block-effect-reduction step can be applied to the reference images before they are stored in the list, this step is implemented by means of filtering operations, and the decoder cannot do these filtering operations or make a less complex version of them;

the motion module used plays on the complexity of the motion compensation: a translation calls for simple operations of addition while a refined transformation (i.e. in an open-ended model of the video encoder) implies more complex operations of multiplication. The decoder can then take a simplified model of motion to reduce the complexity;

the precision or binary resolution, of the computations made also affects the complexity of the operations. The greater the precision, the greater the memory space need for the data (for example, computations of greater precision are implemented for images with dynamic ranges of color levels on 12 bits than for images with color levels on 8 bits);

the synthesis step to create synthesized images that can serve for prediction may be complex to carry out according to the algorithm chosen, the complexity of the algorithm often going together with its performance. This step may be even completely eliminated from the decoding of the current image and replaced by a less complex prediction mode (for example an intra-image mode of prediction or prediction by motion compensation of the SKIP type).

These different possibilities of choice of complexity and other possibilities make it possible to define the tools illustrated in FIG. 1 in a manner adapted to each decoder. It can be understood that these tools are not necessarily modules that are completely independent of one another, as was illustrated in FIG. 1 for reasons of simplicity of the explanation, but may correspond to one and the same module, parametrized differently (for example in terms of number of bits taken into account, number of DCT coefficients processed etc).

2.4 Control Images

The following section explains the mechanism of controlling drift according to an embodiment of the invention in a variable-complexity decoder.

a) Drift Control

To prevent any drift in the signal rebuilt at the decoder, classic encoders work in a closed loop, i.e. the temporal prediction or spatial prediction at the encoder is done by means of images or parts of the current image that are encoded-decoded.

An embodiment of the invention overcomes this constraint (at least on a part of the images to decoded).

Indeed, according to an embodiment of the invention, the encoder cannot predict the quality of each image rebuilt by each decoder (the encoder can predict only maximum quality, obtained when the decoder decodes at the "nominal" complexity level). Indeed, depending on its resources or needs, a decoder can choose to perform the decoding steps with a lower complexity than those performed at encoding.

The images that will be rebuilt at the decoder will therefore be different from those rebuilt at the encoder and the images used for prediction at the decoder will be different from those used at the encoder. There is therefore a risk of drift.

In order to control this potential drift between the encoder and the decoder, the encoder (implicitly or explicitly) obliges the decoder to decode certain images with a determined level of complexity so as to have a stable reference available regularly (the images decoded at the decoder are in this case identical to those encoded-decoded by the encoder). Here these images are called control images.

It will be noted that, for a control image, the decoder can additionally decode an image with a higher level of complexity, for example for purposes of displaying an image of better quality. The decoder then produces two outputs for this image:

a version with controlled complexity used by the sequence of reference images for decoding other images, and a version of free complexity that can serve to display or again as the reference image for images other than the control image.

b) Signaling of the Control Images

An embodiment of the invention optionally proposes a signaling to distinguish the control images from the other images of the stream. This signaling can be done explicitly or implicitly.

An explicit signaling can be done:

by the insertion of a "degradable image" flag (called for example "fast_decoding_allowed_flag") into the syntax of the current image, a value "TRUE" indicating that the decoding of this image is not essential and can therefore be downgraded. A value "FALSE" indicates that the decoding process of this image is dictated. It must be noted that this flag is different from the notion of reference images (images used for the prediction of other images) existing in compression standards, because a reference image can also be marked as "degradable";

by the insertion of an index of decoding complexity for each image. A particular value (for example: −1) indicating that the image must be decoded along the predetermined path, another particular value (example: "any") indicating that the image can be stored at an arbitrary level, the standard values (example: 0, 1, 2, . . . ) indicating the level of complexity at which this image can be decoded.

An embodiment of the invention can also be applied to existing standards, by the addition of a signaling of the degradable or essential character (for the control images) of the images. This signal may for example be done by means of SEI messages in MPEG-4 AVC, or more generally through generic "user data" fields.

The implicit signaling can thus be done without adding any syntax to the existing syntax (for example that of an existing compression standard). The control images are then determined by:

a particular value of the reference image syntax element in MPEG-4 AVC (Nal_Ref_Idc);

the decoding syntax element with the minimum scalable MPEG-4 AVC quality or the temporal level syntax element, or the priority level syntax element for an image;

the type of current image: "I" or "P".

In another variant, the list of control images, or the means used to locate them, may be defined in a descriptor present at the start of the stream and/or given periodically.

It must be noted that it is not obligatory for all the control images to be processed in the same way. The signaling can also indicate the particular path to be used for each control image (or for a set of control images).

c) Variable-Complexity Decoding with Control Images

At the decoding, depending on its capacities, and taking account of the signaling if any, the decoder can choose the complexity of the decoding operation that it wishes to perform.

More specifically, for the images that are not control images and for each step of decoding such an image, it choose the tool to be used, among the tools possible for this step, as a function especially of the complexity of each tool. In other words, the decoder has the choice of decoding path, or sequence (FIG. 1).

However, for certain predetermined images, i.e. the control images, the decoder will routinely choose the tools associated with the nominal complexity dictated by the encoder for the storage of the reference image or those defined by the video compression standard with which it is complying.

Figure 4:
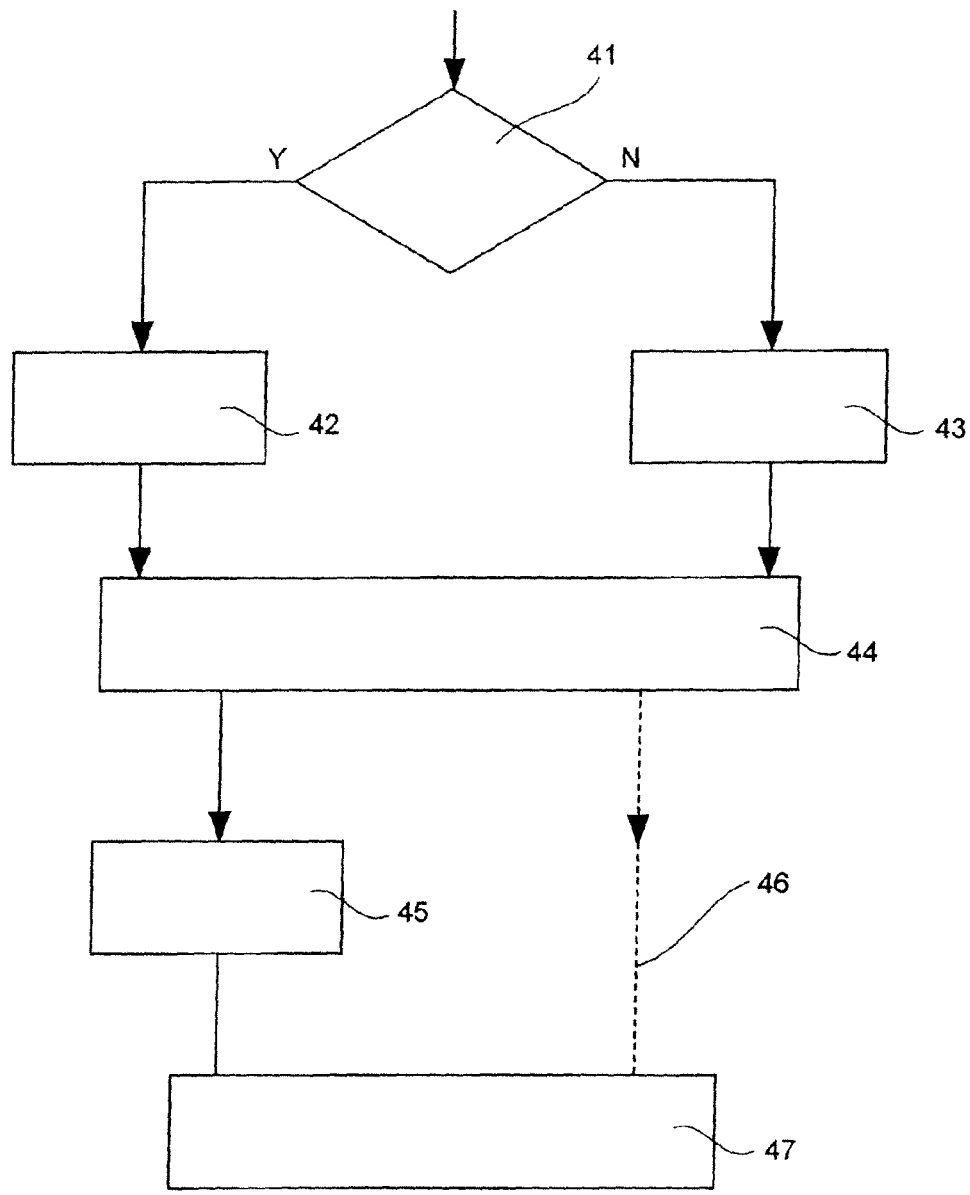
FIG. 4 is a schematic illustration of the distinguishing of the control images and intermediate images according to an embodiment of the invention.

This approach is illustrated by FIG. 4. If the image is a control image (test 41), the dictated path used by the encoder is identified (42) (either implicitly or explicitly as specified here above). If this is not the case, this is an image known as the intermediate image and the decoder can select (43) the most suited path and for example a path of lower quality if the decoder has limited resources.

Then, the decoding 44 is done along the identified path. If it is a control image, it is stored (45) for use during the decoding of the following images so as to prevent drift.

Optionally, the decoder can use a second level (in principle a higher level) of complexity of the tools to rebuild a second image 46 (typically intended for display or usable for the prediction of an image which might not be a control image).

The decoded images are then restored (47) on a screen.

Figure 5:
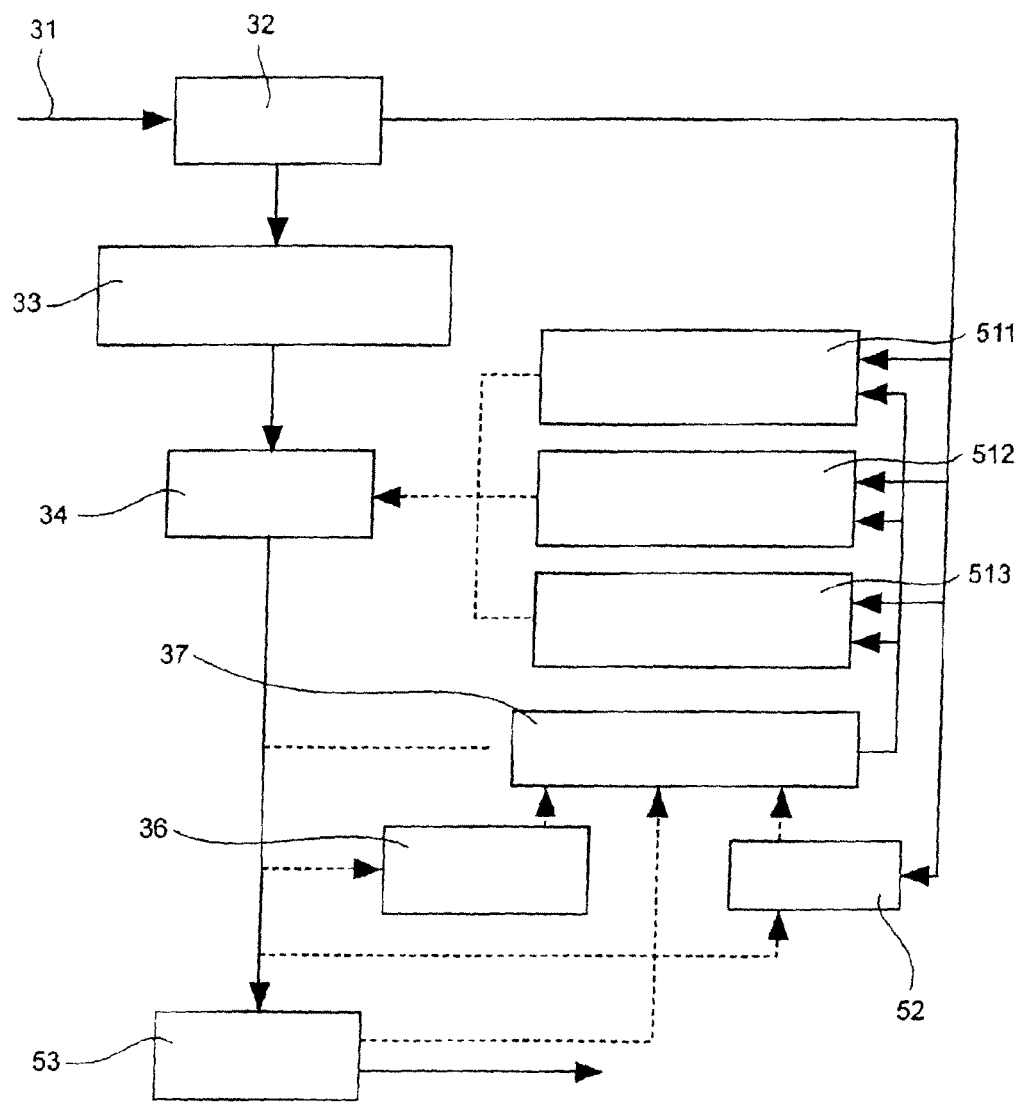
FIG. 5 is a scheme of an example of decoding according to an embodiment of the invention adapted to the encoding of FIG. 2.

FIG. 5 illustrates the decoding mechanism modified according to an embodiment of the invention by comparison with the mechanism of FIG. 3. The dotted arrows show the optional paths that the decoding method can follow depending on the image that it must decode and the resources of the decoder.

Thus, the decoding can for example have three types of prediction computation, 511, 512 and 513 having different levels of complexity (the module 511 corresponds for example to the module 35 of FIG. 3, and can be imposed for the control images.

Optional steps for modules can be provided, for example a synthesis module 52 that feeds the prediction modules 511, 512 and 513 and/or the post-processing modules 53 for improvement of the image (for example by filtering).

It can be also noted that other modules such as block effect reducing modules 36 become optional for all the intermediate images (images that are not control images).

The syntactic decoding 32 can deliver information on the type of image especially report control images (and as the case may be the decoding path to be used for these images) if these information elements are not implicit.

It can be understood that FIG. 5 gives only one example among many possible examples as one of the advantages of an embodiment of the invention is that it allows for easy coexistence of several types of decoders of different levels of complexity. It is therefore easy to add or eliminate the modules or steps or to parametrize them differently to define different decoders (provided that these decoders have minimum means to process the control images).

For example, a very simple decoder could have no more than two paths, the dictated path for the control images and a simplified path or downgraded path for the intermediate images. By contrast, a "top-range" decoder will, in addition to the path dictated for the control images, have at least one higher-quality path which it could use both for the intermediate images and for the control images in order to restore them (the dictated path continuing to be used to decode the following images).

The plurality of paths available in such a decoder will make it possible to optimize the decoding according to the type of image (motion, colors etc), the type of contents (film, sports, documentaries, etc), an available transmission bit-rate, a screen size or a selected resolution, a user's request etc.

The approach of an embodiment of the invention makes it possible to provide new decoders using improved decoding techniques (for example a new filter) without modifying the encoding. It is also possible to update decoders, for example by downloading a new tool, or a new sequence of tools, again without acting on the encoding process.

Although the present disclosure has been described with reference to one or more examples, workers skilled in the art will recognize that changes may be made in form and detail without departing from the scope of the disclosure and/or the appended claims.

The invention claimed is:

1. A method for decoding a signal comprising digital images, including reference images, in a decoding terminal, implementing a variable-complexity decoding, making it possible, for at least one step of the decoding, to select at least one decoding tool from among at least two available decoding tools, wherein the method comprises:

reading, in said signal comprising digital images, at least one piece of identification information, which identifies first images among said digital images, called control images, said piece of identification information indicating explicitly that a reference image of said digital images of a type I, P or B, used for prediction of other of the digital images, is degradable or not;

from said piece of identification information, identification, among said digital images, said control images corresponding to the digital images that are not degradable, and second images, called intermediate images corresponding to the images that are degradable;

applying, to each of said control images, for at least one step of the decoding, at least one predetermined decoding tool dictated by said signal comprising digital images; and applying, to at least one of said intermediate images, for at least one step of the decoding, at least one decoding tool selected by said decoding terminal and not dictated by said signal comprising digital images.

2. The method for decoding according to claim 1, wherein said signal comprising digital images comprises firstly pieces of non-degradable information and secondly pieces of degradable information and wherein said step of identification considers at least said pieces of non-degradable information to be control images.

3. The method for decoding according to claim 1, wherein said step of identification includes reading, in said signal comprising digital images, at least one piece of processing information for at least one of said control images, specifying said predetermined decoding tool or tools to be applied to said control images.

4. The method for decoding according to claim 1, wherein the method selectively implements a plurality of sequences of decoding tools each comprising at least one of said tools, and wherein said steps of applying use, for each of said images, one of said sequences of decoding tools.

5. The method for decoding according to claim 1, wherein said at least one predetermined decoding tool belongs to the group comprising:
- spatial prediction tools taking account of all or part of frequency coefficients of at least one part of at least one image;
- temporal prediction tools using interpolation filters of different sizes;
- tools for taking account of pixel or subpixel motion;
- block effect filtering tools;
- motion compensation tools using different motion models;
- image synthesis tools;
- at least two tools providing for a same decoding function and using different levels of binary representation.

6. A terminal for decoding a signal comprising digital images, including reference images, implementing a variable-complexity decoding making it possible, for at least one step of decoding, to select at least one decoding tool from among at least two available decoding tools, wherein the terminal comprises:
- means for reading, in said signal comprising digital images, at least one piece of identification information, which identifies first images among said digital images, called control images, said piece of identification information indicating explicitly that a reference image of said digital images of a type I, P or B, used for prediction of other of the digital images, is degradable or not;
- means for identifying from said piece of identification information, among said digital images, said control images corresponding to the digital images that are not degradable, and second images, called intermediate images corresponding to the images that are degradable;
- means for applying, to each of said control images, at least one predetermined decoding tool dictated by said signal comprising digital images; and
- means for applying, to at least one of said intermediate images, for at least one step of the decoding, at least one decoding tool selected by said terminal and not dictated by said signal comprising digital images.

7. A computer program product recorded on a non-transitory computer-readable medium and executable by a processor, wherein the product comprises program code instructions for implementing a method of decoding a signal comprising digital images, including reference images, in a decoding terminal, implementing a variable-complexity decoding, making it possible, for at least one step of the decoding, to select at least one decoding tool from among at least two available decoding tools, when said instructions are executed, wherein the method comprises:
- reading, in said signal comprising digital images, at least one piece of identification information, which identifies first images among said digital images, called control images, said piece of identification information indicating explicitly that a reference image of said digital images of a type I, P or B, used for prediction of other of the digital images, is degradable or not;
- from said piece of identification information, identification, among said digital images, said control images corresponding to the digital images that are not degradable, and second images, called intermediate images corresponding to the images that are degradable;
- applying, to each of said control images, for at least one step of the decoding, at least one predetermined decoding tool dictated by said signal comprising digital images; and
- applying, to at least one of said intermediate images, for at least one step of the decoding, at least one decoding tool selected by said decoding terminal and not dictated by said signal comprising digital images.

* * * * *